United States Patent
Post et al.

(10) Patent No.: US 8,425,776 B2
(45) Date of Patent: *Apr. 23, 2013

(54) BIOFILM REMEDIATION OF METAL CONTAINING WASTEWATER

(75) Inventors: James Christopher Post, Mars, PA (US); Garth David Ehrlich, Pittsburgh, PA (US); John William Costerton, Pittsburgh, PA (US)

(73) Assignee: Allegheny-Singer Research Institute, Pittsburgh, PA (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/820,769

(22) Filed: Jun. 22, 2010

(65) Prior Publication Data

US 2011/0006000 A1    Jan. 13, 2011

Related U.S. Application Data

(60) Provisional application No. 61/219,239, filed on Jun. 22, 2009, provisional application No. 61/219,249, filed on Jun. 22, 2009.

(51) Int. Cl.
*C02F 3/06* (2006.01)
*C02F 3/34* (2006.01)

(52) U.S. Cl.
USPC ........ 210/610; 210/617; 210/631; 210/747.7; 210/912; 435/262.5

(58) Field of Classification Search ............ 210/615, 210/617, 747.7, 150, 151, 170.01, 170.07, 210/241, 747.1, 610, 611, 631, 912; 435/262.5
See application file for complete search history.

(56) References Cited

U.S. PATENT DOCUMENTS

| | | | |
|---|---|---|---|
| 4,800,959 A | | 1/1989 | Costerton et al. |
| 4,925,552 A | * | 5/1990 | Bateson et al. ............... 210/150 |
| 4,999,103 A | * | 3/1991 | Bogart .......................... 210/151 |
| 5,174,378 A | | 12/1992 | Costerton et al. |
| 5,232,586 A | * | 8/1993 | Malone ......................... 210/151 |
| 5,312,813 A | | 5/1994 | Costerton et al. |
| 5,510,032 A | * | 4/1996 | Vail et al. ..................... 210/617 |
| 5,597,484 A | * | 1/1997 | Tolley et al. ................. 210/617 |
| 5,833,857 A | * | 11/1998 | Roth ............................. 210/241 |
| 5,908,555 A | * | 6/1999 | Reinsel et al. ............... 210/617 |
| 6,123,840 A | * | 9/2000 | Suzuki et al. ................ 210/151 |
| 6,146,586 A | | 11/2000 | McLeod et al. |

(Continued)

OTHER PUBLICATIONS

Laopaiboon et al., "Effect of Glutaraldehyde Biocide on Laboratory-Scale Rotating Biological Contactors and Biocide Efficacy", Electronic Journal of Biotechnology ISSN: 0717-3458, Jul. 15, 2006, vol. 9 Issue 4, Pontificia Universidad Catolica de Valparaiso, Chile.

(Continued)

*Primary Examiner* — Christopher Upton
(74) *Attorney, Agent, or Firm* — Fox Rothschild LLP

(57) ABSTRACT

A method of in situ treatment of wastewater that is contaminated with a heavy metal may include passing a flow of contaminated wastewater through a reactor vessel. The reactor vessel may contain a plurality of biofilm retaining structures. Each of the structures may at least be partially coated with a biofilm. Additionally, the biofilm may include a plurality of bacteria retained in a matrix and the matrix may include DNA, protein and carbohydrates produced by the bacteria.

4 Claims, 2 Drawing Sheets

U.S. PATENT DOCUMENTS

| | | | |
|---|---|---|---|
| 6,183,644 | B1 | 2/2001 | Adams et al. |
| 6,455,031 | B1 | 9/2002 | Davies et al. |
| 6,630,067 | B2 * | 10/2003 | Shieh et al. .................... 210/150 |
| 6,761,823 | B2 * | 7/2004 | Maddux et al. ............... 210/617 |
| 7,094,394 | B2 | 8/2006 | Davies et al. |
| 7,326,344 | B2 * | 2/2008 | Cotoras Tadic et al. ...... 210/617 |
| 7,550,087 | B2 | 6/2009 | Peeters et al. |
| 2003/0203476 | A1 * | 10/2003 | Fliermans .................. 435/262.5 |
| 2008/0237141 | A1 | 10/2008 | Kerfoot |
| 2008/0257820 | A1 | 10/2008 | Peeters et al. |
| 2010/0319913 | A1 * | 12/2010 | Post et al. ..................... 166/267 |
| 2011/0039291 | A1 * | 2/2011 | Chen et al. .................... 210/601 |

OTHER PUBLICATIONS

Anderson et al., "Stimulating the in Situ Activity of Geobacter Species to Remove Uranium from the Groundwater of a Uranium-Contaminated Aquifer", Applied and Environmental Microbiology, Oct. 2003, 69(10), pp. 5884-5891, American Society for Microbiology.

Doshi, "Bioremediation of Acid Mine Drainage Using Sulfate-Reducing Bacteria", U.S. Environmental Protection Agency Office of Solid Waste and Emergency Response Office of Superfund Remediation and Technology Innovation, Aug. 2006, Washington D.C.

U.S. Department of Energy Office of Science, "DOE Mission: Environmental Remediation", Genomics; GTL Roadmap, Aug. 2005.

"Produced Water Beneficial Re-Use High TDS Water", PTAC Petroleum Technology Alliance Canada, Aug. 1, 2007, pp. 1-57, XP002627131, Canada, Retrieved from the Internet: URL:http://www.ptac.org/etalk/d1.HighTDS.pdf [retrieved on Mar. 8, 2011], pp. 25-26, p. 40.

Ahsraf Muhammad et al: "Microbial Biofilms for Environmental Waste Management: An Overview", [Online], vol. 38 No. 2, 2001, pp. 1-11, XP002609296, The Nucleus Retrieved from the Internet: URL:http://pu-pk.academia.edu/AshrafMuhammad/Papers/92784/Microbial_Biofilms_For_Environmental_Waste_Management_An_Overview> [retrieved on Nov. 12, 2010], p. 4, line 3, paragraph 1, "Benefits of the microbial biofilms" pp. 5-6, "Removal of heavy metals"; p. 6, p. 8, lines 1-5, p. 11; figure 2.

P Sing et al: "Enhancement of metal bioremediation by use of microbial surfactants", [Online], vol. 319, No. 2, May 18, 2004, pp. 291-297, XP002609504, DOI: 10.1016/j.bbrc.2004.04.155, Bichemical and Biophysical Research Communications—BBRC, Retrieved from the Internet: URL:http://www.sciencedirect.com/> [retrieved on Nov. 12, 2010], "Metal remediation and biofilms"; p. 294, left-hand column—p. 295, left hand column.

* cited by examiner

BIOFILM REMEDIATION OF METAL CONTAINING WASTEWATER

CROSS-REFERENCE TO RELATED APPLICATIONS

This patent application claims priority to co-pending U.S. Provisional Patent Application No. 61/219,239, entitled "Biofilm Remediation of Fracture Fluid", filed on Jun. 22, 2009 and U.S. Provisional Patent Application No. 61/219,249, entitled "Biofilm Remediation of Metal-Containing Wastewater", filed on Jun. 22, 2009, each of which are incorporated herein by reference in their entireties.

BACKGROUND

Heavy metal-containing wastewater is generated in industries such as the steel industry, metal plating, and the nickel industry. It also arises from storm water runoff in large parking lots, airports, and other areas. Such wastewater cannot be discharged into the environment without being treated first to avoid adverse effects on ecology and human health. Current disposal methods are unsatisfactory for environmental or economic reasons and do not provide for the recycling of the wastewater.

Failure to develop a satisfactory solution to wastewater disposal could result in continued slowing of the growth of the relevant industry, increase in the cost of water management and adverse effects on health and environment.

The methods and systems described in this document are directed to treatment of metal-containing wastewater, such as that generated in metals industries or from storm water runoff.

SUMMARY

In one embodiment, a method of in situ treatment of wastewater that is contaminated with a heavy metal is described. In certain embodiments, the method comprises passing a flow of contaminated wastewater through a reactor vessel. The reactor vessel may contain a plurality of "biofilm retaining structures". Such structures may be in any shape or form such as, but not limited to, saddles, spheres, cubes, nut shells or combinations thereof. These structures are utilized to enlarge the surface area that the biofilm grows on and may provide nutrients and supply to the biofilm-producing bacteria. Each of the structures may at least be partially coated with a biofilm. Additionally, the biofilm may include a plurality of bacteria retained in a matrix and the matrix may include DNA, protein and carbohydrates produced by the bacteria.

In another embodiment, the biofilm may be grown on nut shells such as, but not limited to, walnut shells, pistachio shells, peanut shells or combinations thereof.

In yet another embodiment, the heavy metal is, but not limited to, cadmium, iron, nickel, radium, uranium, cobalt, lead, manganese, and arsenic. In one embodiment, the biofilm is inert with respect to the waste water. Additionally, the matrix may be electrostatically charged, which attracts the metals and draws them into the matrix.

In selected embodiments, the bacteria that are used for bioremediation include at least one of the following genera: *Pseudomonas, Aeromonas, Klebsiella, Bacteroides* and a combination thereof.

In yet another embodiment, the bacteria that are used for bioremediation include at least one of the following: *Deinococcus geothermalis*, and *Deinococcus radiodurans*.

In another embodiment, the bacteria that are used for bioremediation include at least one of the following: *Vibrio proteolyticus, Shewanella piezotoleran, Shewanella Baltica* and combinations thereof. In another embodiment, the bacteria that are used for bioremediation may include: *Pantoea agglomerans, Vibrio vulnificus* and combinations thereof.

BRIEF DESCRIPTION OF THE DRAWINGS

For a fuller understanding of the nature and advantages of the present embodiments, reference should be made to the following detailed description taken in connection with the accompanying drawings.

DETAILED DESCRIPTION

Figure 1:
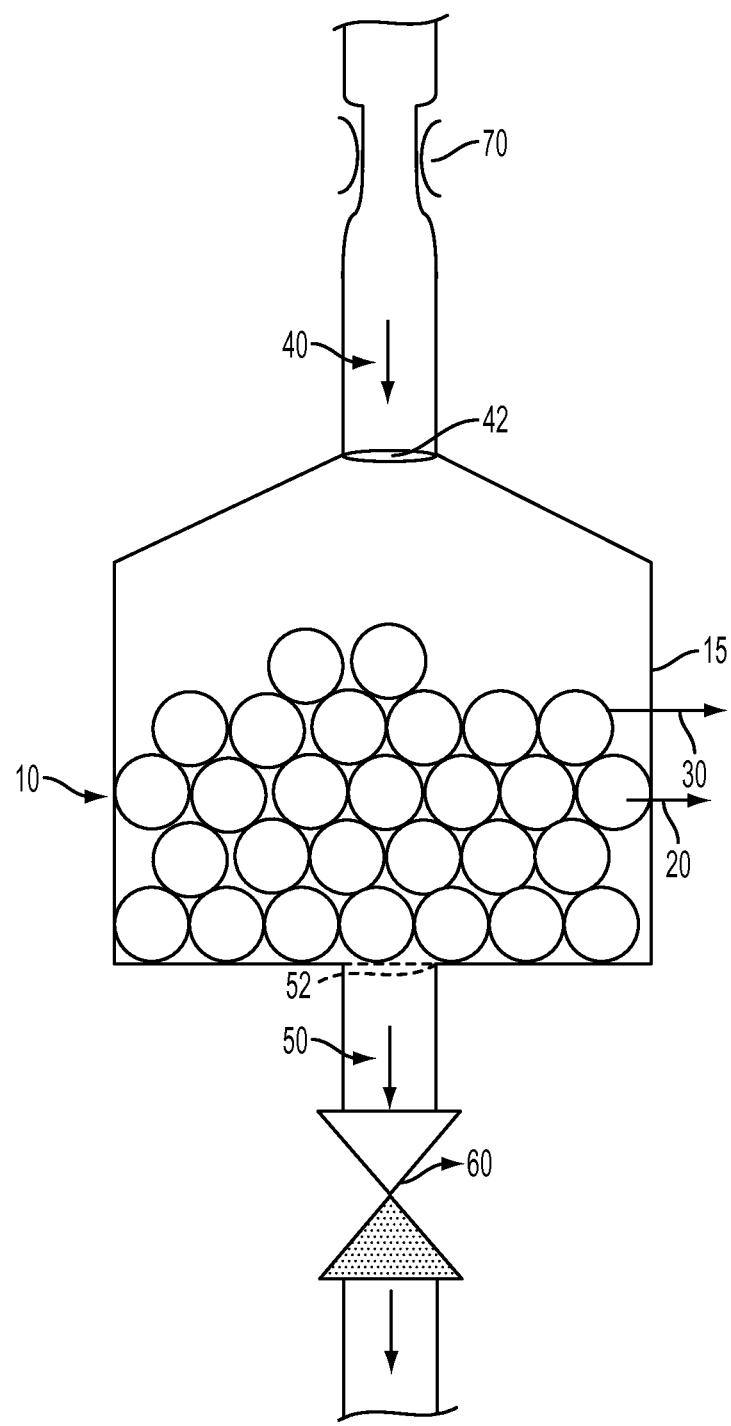
FIG. 1 depicts an exemplary structure of a reactor vessel.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims. All publications mentioned herein are incorporated by reference in their entirety. Nothing herein is to be construed as an admission that the invention is not entitled to antedate such disclosure by virtue of prior invention.

As used herein, and in the appended claims, the singular forms "a," "an," and "the" include plural reference unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

As used herein, all claimed numeric terms are to be read as being preceded by the term "about," which means plus or minus 10% of the numerical value of the number with which it is being used. Therefore, a claim to "50%" means "about 50%" and encompasses the range of 45%-55%.

The methods and systems described in this document are directed to a biofilm-based bioremediation technology that removes impurities such as heavy metals from the recovered wastewater that may be at or near the site of its recovery. This method may allow the wastewater to be recycled. Bioremediation is any process that uses microorganisms, fungi or plants to return the natural environment altered by contaminants to its original condition. This process allows for reconditioning of wastewater for reuse. Bioremediation of many synthetic organic compounds is carried out by indigenous microorganisms, principally heterotrophic bacteria, which transform contaminants to intermediate products, innocuous end products or immobilized substances.

We have discovered that recovered waste fluids may be passed through a biofilm that removes heavy metals from the fluid and captures the metals. The bacterial genera that are used for bioremediation may include at least one of the following genera: *Pseudomonas, Aeromonas, Klebsiella, Bacteroides* and a combination thereof. Specific bacterial strains that may be used for bioremediation include *Deinococcus geothermalis, Deinococcus radiodurans* and combinations thereof which are radiation and heat resistant. The genome of *Deinococcus geothermalis* has been sequenced and has been designated a GenBank Accession ID:

CP000359. The genome of *Deinococcus radiodurans* has been sequenced with designated GenBank Accession ID: AE000513.1 for Chromosome 1, GenBank Accession ID: AE001825.1 for Chromosome 2, GenBank Accession ID: AE001827.1 for R1 plasmid CP1, and GenBank Accession ID: AE001826.1 for plasmid MP1. The genome of metal-reducing bacteria named Geobacter FRC-32 has been sequenced with designated GenBank Accession ID: CP001390. In one embodiment, specific cultivated bacterial strains and natural bacterial enrichments may be selected that favor the formation of biofilms with optimal metal binding capabilities.

In another embodiment, the bacteria that are used for bioremediation include at least one of the following: *Vibrio proteolyticus, Shewanella piezotolerans* (with designated GenBank Accession ID: CP000472), *Shewanella Baltica* (with designated GenBank Accession IDs: AM743169, CP001252, CP000753, CP000891, and CP000563) and combinations thereof. In another embodiment, the bacteria that are used for bioremediation may include: *Pantoea agglomerans, Vibrio vulnificus* (with designated GenBank Accession IDs: AE016795 and AE016795) and combinations thereof.

In certain embodiments, the bacteria may be modified with a tag, barcode or other genetic identifier to allow for identifying the source of biofilm. Tagging and barcoding of bacteria can be done by any method known to one skilled in the art such as, but not limited to, by genetic modifications, fluorescent labeling and unique identifier polymers. In yet another embodiment, tagging and/or barcoding of bacteria allows for detection of maturation of biofilm. In such methods unique identifiers such as, but not limited to, genetic modifications, fluorescent labeling and unique polymers are utilized to signal the maturation of biofilm for efficient remediation of wastewater. When bacteria are modified to include an identifier, the identifier will be reproduced as the biofilm grows in the vessel. As used in this document, a general reference to a bacteria is intended to include both the unchanged bacteria and a bacteria that is so modified with an identifier.

Direct examinations of bacteria growing in natural and engineered ecosystems show that these organisms live, almost exclusively, in matrix-enclosed "biofilms" composed of cells (about 15% of volume) embedded in extracellular polymeric substances (about 85% of volume). The viscous adherent nature of these biofilms gives them the property of a "skin-like" layer that tends to exclude oxygen. Bacteria's metabolic activity further depletes oxygen, so that any area under even the thinnest biofilm (about 50 microns) is functionally anaerobic. This anaerobiasis is seen in rich soils, comprised of several layers of hydrated biofilms. However, dry porous soils allow the penetration of oxygen to a depth of several centimeters. Field trials have shown that the placement of bacteria in a subsurface environment, with sufficient nutrients to promote growth and sufficient water to maintain hydration, results in the formation of a "biobarrier" composed of biofilms that limit water movement and result in deep anaerobic zones.

A biofilm includes one or more bacteria strains disposed in a matrix containing extracellular polymeric substances such as DNA, protein and/or carbohydrates, some of which may be produced by the bacteria. Growth in biofilms allows bacteria to remain stationary in any porous ecosystem (i.e., soil), and to trap nutrients and metals through their water channels. The trapping system derives from the characteristics of the bacterial extracellular polysaccharide (EPS) matrix, which is composed largely of uronic acid (sugar molecules with two carboxylic acid moieties that impart an overall negative charge). Thus, the EPS matrix acts as an ion exchange material that immobilizes positively charged molecules or ions that penetrate through the water channels. In some embodiments, the matrix may make up about 85% by volume of the film, while the bacteria strains may make up about 15% by volume of the film. Other ranges are possible. For example, the matrix may make up about 50% by volume of the film, the matrix may make up about 60% by volume of the film, the matrix may make up about 70% by volume of the film, the matrix may make up about 80% by volume of the film, or the matrix may make up about 90% by volume of the film.

Biofilms provide structures to trap radioactive materials and other heavy metals. Biofilms may be encased in a polysaccharide matrix (also known as "slime") that surrounds the bacteria and, in some embodiments, make up about 85% of the volume of biofilms. The matrix may include an anionic polymer. Anionic polymers are molecules with an enormous affinity for metals and may be co-polymers of acrylamide with increasing contents of acrylic groups, which give the polymers their negative charges. An example of an anionic polymer includes, but is not limited to, uronic acids such as alginates. Additionally, fully charged matrices can trap negative particles via their bound positively-charged metal ions.

In yet another embodiment, biofilms may be formed on suitable surfaces also referred to as "biofilm retaining structures" such as, but not limited to, saddles, spheres, cubes, nutshells and combinations thereof to establish "bed reactors". A bed reactor is a container or vessel containing a number of biofilm or coated a structure through which wastewater is passed.

FIG. 1 illustrates an exemplary reactor vessel 10 for treating metals-containing wastewater. The vessel 10 includes a tank structure 15 which may be made of glass, ceramic, or another material that is resistant to corrosion. An intake opening 42 may be connected to input tube 40 for delivery of fluid into the tank structure. An output tube 50 may be connected to an outlet opening 52 for the transmission of fluid that exits the tank structure. The tank structure holds a biofilm retaining structure 20, and a biofilm 30 wherein the input tube, output tube, the biofilm retaining structure and the biofilm are configured so that the wastewater is uniformly exposed to the biofilm while in the vessel.

The biofilm retaining structures are any structures that provide surface area on which the biofilm may attach and grow. The structures may be glass, ceramic, or an organic material. Examples include saddle-shaped ceramic structures such as those shown in FIG. 2, glass beads, other structures shaped as hollow fibers, spheres, cubes or other shapes, organic material such as nut shells, or combinations any of these items. In various embodiments, the shapes may be irregular or otherwise not able to be tightly packed (as with a saddle or sphere) to maximize surface area.

Before the reactor vessel is used to treat the wastewater, the biofilm must be grown in the tank structure. To do this, the desired bacteria may be introduced into the vessel, either directly from a cultivated strain, or indirectly by passing wastewater or other fluid that contains the bacteria into the vessel. The bacteria will attach to the retaining structures and grow over a period of time. Fluid will be retained in the vessel to support growth, and the fluid may include material that will enhance the growth such as sugar, organic matter, or other material to promote reproduction of the bacterial In another embodiment, the reactor vessel may further include or be in fluid connection with a one-way valve 60 connected to the outlet tube to prevent re-entry of the fluid into the outlet tube 50 after the fluid passes through the valve. In yet another embodiment, the reactor vessel may further include or be connected to a flow regulator 70 that limits the flow rate of the fluid into the chamber.

The biofilm may include or be produced by a bacteria that removes a heavy metal such as cadmium, iron, nickel, radium, uranium, cobalt, lead, manganese, arsenic or combinations thereof. For example, the bacteria may include at least one of the following: *Deinococcus geothermalis, Deinococcus radiodurans* and combinations thereof.

Figure 2:
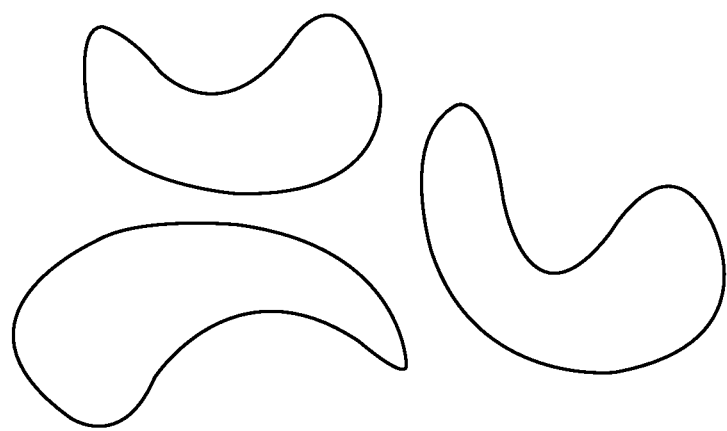
FIG. 2 depicts an exemplary structure of a group of "saddles" on which bacteria can grow.

FIG. 2 shows a group of saddles made of a ceramic or other inert material on which a biofilm may grow as biofilm retaining structures. The saddle may be made of a material that does not react with the biofilm, such as glass or ceramic. Alternatively, the retaining structures may be made of an organic material, such as nut shells, that provides nutrients to the biofilm.

In yet another embodiment, a site specific method for removing heavy metals from contaminated wastewater comprising: isolating endemic microbes from the heavy metal contaminated wastewater; screening the endemic microbes for heavy metal reduction and removal; selecting cultures of heavy metal removal organisms; optimizing the cultures for heavy metal reduction; and establishing a high density biofilm of the heavy metal reducing organisms within a reactor.

In an embodiment, a method of treating wastewater includes collecting wastewater, passing the wastewater through a reactor vessel to remove one or more heavy metals from the wastewater, and returning the wastewater to a location for re-use. In an embodiment, reusing the wastewater may include introducing the wastewater back in the natural resource after heavy metal removal. The heavy metal may include, for example, cadmium, iron, nickel, radium, uranium, cobalt, lead, manganese or arsenic.

Very large volumes of wastewater can be passed through these fixed bed reactors. Fluidized bed reactors may be used if there is a significant tendency to plug the reactor with either the fluid being processed, or with biofilm growth in response to the presence of organic nutrients in the fluid. Fixed bed reactors may be used if the viscosity of the fluids being treated is such that boundary plugging can be obviated.

Metal removal may be measured by atomic adsorption until the optimal level of removal is obtained. When a high degree of metal removal has been obtained (i.e., up to 100% removal), the microbial population on the biofilm retaining structures may be analyzed by the Ibis method or another method, and the species composition of the microbial population that shows the best metal removal kinetics may be recorded. In such a manner, one may determine an appropriate microbial species to target removal of a particular metal.

Heavy metals that may be removed by the methods and systems described above include, but are not limited to, cadmium, iron, nickel, radium, uranium, cobalt, lead, manganese and arsenic. The microbial biofilms may trap metallic ions and remove toxic metals from waste fluids.

In one embodiment, bioremediation may occur as the water passes through the biofilm. The biofilm may convert the metals to valence states in which they are non-toxic and/or insoluble so that they can be disposed of in safer and more economical manners. An example is the conversion of uranium from the mobile 2x valence to the 6x valence in which it is a fine, black, insoluble precipitate. The remediation may not "destroy" the metal, but the bacteria may convert the metals from one valence state to another. This conversion, in turn, provides energy for bacterial metabolic processes. The trapping system may arise at least in part from the characteristics of the extracellular matrix. For example, a matrix that substantially includes uronic acids, which are sugar molecules with two carboxylic acid moieties that impart an overall negative charge, may act like an ion exchange material. Such a material would immobilize any positively charged molecules or ions that penetrate its open water channels. Fully charged matrices can even trap negative particles via their bound positive metal ions. Metals may be precipitated by the chemical and physical conditions inside the bioreactor, in which pH changes may render certain metals to be insoluble, and the valences of some metals may be changed by oxidizing or reducing conditions.

In one embodiment, an oxygen barrier is built by producing large amounts of metabolically active microbial biofilms at the first available water surface in a contained system. Every water surface has a hypolimnion composed of microbial biofilms. The biological layers are thickened by providing large amounts of organic matter, such as manure containing straw, that will float at the surface and gradually release soluble components to promote biofilm development.

In one embodiment, bioremediation may occur as the water passes through the biofilm. The biofilm may convert the metals to valence states in which they are non-toxic and/or insoluble so that they can be disposed of in safer and more economical manners. An example is the conversion of uranium from the mobile 2x valence to the 6x valence in which it is a fine, black, insoluble precipitate. The remediation may not "destroy" the metal, but the bacteria may convert the metals from one valence state to another. This conversion, in turn, provides energy for bacterial metabolic processes.

In one embodiment, biofilms and their derivatives may act as molecular "sponges" for trapping heavy metals in wastewater. Even without full knowledge of the chemical composition of wastewater, biocides present in wastewater can be neutralized with chemicals. The fluid is then passed through biofilm reactors very similar to those used in "pump and treat" operations to bioremediate subsurface plumes of organic pollutants. These biofilm reactors trap most metals and alter the valence states of them to produce insoluble deposits from soluble entities.

The bed reactors described herein may be transportable, and may be used in situ, such as on the site where the wastewater removal occurs. For example, a biofilm reactor can be mounted on a vehicle such as a truck. A reactor may have a tank that is about 3 meters in diameter and about 2 meters high. After neutralization of biocides, contaminated wastewater may be pumped through a bioreactor. Metals bind to the biofilm and are removed from the wastewater. The treated wastewater is then metal-free and can be pumped and reused or disposed, or sent for treatment of other contaminants.

Once the metal composition in the contaminated wastewater is known, specific bacteria may be selected for the biofilm to allow for efficient containment of each metal (e.g., Schewanella that makes 6X valence uranium). Thus, unique, site-specific, complex polymicrobial communities and other bioremediation solutions may be applied based on the decontamination needs of individual sites, as not all sites produce the same set of waste products. The advantage of this technique is the ability to first characterize the contamination at a molecular level and then develop targeted approaches to bioremediate efficiently.

After many uses, the truck-mounted bioreactor may be driven to a specific location; the biofilms may be dissolved with bleach, an antibacterial compound, an antifungal compound or combinations thereof. The metals may be recovered for commercial exploitation or safe disposal. The biofilm retaining structures may then be used to regenerate new biofilms for re-use of the reactor.

The biofilm reactors can be mounted on trucks, so that effective bioremediation can allow the local re-use of wastewater in the field. In addition, the efficiency of the treatment can be monitored by flame photometry, so that this re-use can be virtually immediate.

In one embodiment, the biofilm may be regenerated after several days of use. In certain embodiments, the biofilm may be regenerated after the efficiency of metal uptake falls below 80%. In yet another embodiment, the biofilm may be regenerated after the efficiency of metal uptake falls below 70%. In another embodiment, the biofilm may be regenerated after the efficiency of metal uptake falls below 60%.

In one embodiment, methods of destroying and regenerating biofilm retaining structures using a biocide may be used. Biocides may be used to destroy biofilms after several uses or when the biofilm reaches saturation from metal uptake. In one embodiment, the biofilm may be regenerated after the efficiency of metal uptake falls below 80%. In yet another embodiment, the biofilm may be regenerated after the efficiency of metal uptake falls below 70%. In another embodiment, the biofilm may be regenerated after the efficiency of metal uptake falls below 60%.

The biocide may include bleach, antibacterial, antifungal and compositions thereof. In certain embodiments, 5% v/v bleach is used for about 4 hours to digest the biofilm. It may take up to about 1 week to regenerate the biofilm. In an embodiment, bacteria are inoculated and grown in a medium containing nutrients such as, but not limited to, tripticase soy broth.

The methods and systems described in this document are directed to populate biofilm reactors with bacterial species that can reliably carry out the transformations needed to trap and alter the metals generated in metals industries and from storm water runoff. In addition, this technology can be custom-made for any geology and exported for worldwide use.

Example

A biofilm may be formed in a glass reaction vessel having a volume of approximately 10 liters. The vessel may be filled to the half or ⅔ level with ceramic saddles having an average maximum dimension of 6 mm. A spoonful of soil from a location that has been exposed to metals-containing wastewater may be added to the vessel, and approximately 50 ml of the water may be collected and added to the vessel. The water may be slowly cycled through the vessel until a biofilm grows on the saddles to form a film that is visually observed to substantially cover the exposed surfaces of the saddles. For example, the fluid may be cycled through 30-50 times, with each cycle allowing the wastewater to be exposed to the film for about 8-10 minutes. After the film is formed in this manner, additional wastewater may be collected and passed through the vessel for metals removal at a flow rate that allows the wastewater to be exposed to the biofilm for at least 8-10 minutes.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

The invention claimed is:

1. A method of treating metal-containing wastewater, comprising:
at a site that has been exposed to metals-containing wastewater, forming a site-specific reaction vessel by:
adding soil that has been exposed to the wastewater into a transportable chamber containing a plurality of retaining structures, and
cycling metals-containing wastewater from the site through the chamber a plurality of times until a biofilm forms on and at least partially covers the retaining structures,
introducing an additional amount of metals-containing wastewater from the site into the reaction vessel,
holding the wastewater in the vessel for a time sufficient for the biofilm to treat the water by removing one or more of the following metals from the water and containing the metal in the biofilm: cadmium, iron, nickel, radium, uranium, cobalt, lead, manganese or arsenic
reusing the treated water at the site; and
after a plurality of wastewater treatment cycles have completed:
destroying the biofilm by introducing a biocide into the reaction vessel;
recovering metals from the vessel;
regenerating the biofilm by repeating the steps of adding soil to the chamber and cycling metals-containing wastewater into the chamber; and
treating an additional amount of the wastewater in the vessel for a time sufficient for the biofilm to remove one or more of the metals from the wastewater.

2. The method of claim 1, wherein destroying the biofilm by introducing a biocide into the reaction vessel includes at least one of bleach, an antibacterial compound, an antifungal compound, or combinations thereof.

3. The method of claim 1 further comprising, during the regenerating, introducing soy broth, sugar or organic matter into the chamber to enhance regeneration.

4. A method of treating metal-containing wastewater, comprising:
at a site that has been exposed to metals-containing wastewater, forming a site-specific reaction vessel by:
adding soil that has been exposed to the wastewater into a transportable chamber containing a plurality of retaining structures,
cycling metals-containing wastewater from the site through the chamber a plurality of times until a biofilm forms on and at least partially covers the retaining structures,
introducing an additional amount of metals-containing wastewater from the site into the reaction vessel, and
after at least a portion of the biofilm is formed and before introducing the additional amount of metals-containing wastewater from the site into the reaction vessel, modifying the biofilm to include a unique identifier that will be reproduced as the biofilm reproduces in the chamber;
holding the wastewater in the vessel for a time sufficient for the biofilm to treat the water by removing one or more of the following metals from the water and containing the metal in the biofilm: cadmium, iron, nickel, radium, uranium, cobalt, lead, manganese or arsenic; and
reusing the treated water at the site.

* * * * *